(12) United States Patent  
Inagaki et al.

(10) Patent No.: US 8,858,060 B2
(45) Date of Patent: Oct. 14, 2014

(54) SURFACE LIGHT EMITTING APPARATUS

(75) Inventors: Satoshi Inagaki, Aichi (JP); Norihito Kino, Aichi (JP)

(73) Assignee: Toyoda Gosei Co., Ltd., Kiyosu-Shi, Aichi (JP)

( * ) Notice: Subject to any disclaimer, the term of this patent is extended or adjusted under 35 U.S.C. 154(b) by 371 days.

(21) Appl. No.: 12/801,177

(22) Filed: May 26, 2010

(65) Prior Publication Data

US 2010/0302804 A1 Dec. 2, 2010

(30) Foreign Application Priority Data

May 28, 2009 (JP) .............................. P.2009-129346
Mar. 30, 2010 (JP) .............................. P.2010-077669

(51) Int. Cl.
*F21V 7/04* (2006.01)
*B60Q 3/02* (2006.01)
*B60Q 3/00* (2006.01)
*F21V 8/00* (2006.01)

(52) U.S. Cl.
CPC ............ *B60Q 3/0279* (2013.01); *G02B 6/0083* (2013.01); *G02B 6/0088* (2013.01); *G02B 6/0051* (2013.01); *G02B 6/0068* (2013.01); *B60Q 3/004* (2013.01)
USPC ............ 362/632; 362/633; 362/606; 362/608

(58) Field of Classification Search
USPC ........ 362/97.3, 555, 558, 561, 606, 612, 613, 362/615, 617, 621, 632; 349/57, 58, 61, 62, 349/65; 345/84, 87, 91
See application file for complete search history.

(56) References Cited

U.S. PATENT DOCUMENTS

| | | | | |
|---|---|---|---|---|
| 7,448,785 B2 * | 11/2008 | Suzuki | ........................ | 362/612 |
| 7,488,104 B2 * | 2/2009 | Hamada et al. | ............... | 362/616 |
| 7,513,661 B2 * | 4/2009 | Hamada et al. | ............... | 362/373 |
| 7,736,047 B2 * | 6/2010 | Ohashi et al. | .................. | 362/631 |
| 8,007,159 B2 * | 8/2011 | Ohashi et al. | ............... | 362/612 |
| 2006/0243948 A1 * | 11/2006 | Ishiwa et al. | ............. | 252/299.61 |
| 2008/0129927 A1 * | 6/2008 | Hamada et al. | ................. | 349/65 |
| 2009/0279284 A1 * | 11/2009 | Takeuchi et al. | ............. | 362/97.3 |
| 2010/0208164 A1 * | 8/2010 | Ohashi et al. | ................... | 349/62 |
| 2010/0214509 A1 * | 8/2010 | Sasaki et al. | .................... | 349/65 |
| 2011/0037740 A1 * | 2/2011 | Yamaguchi | ................... | 345/204 |

FOREIGN PATENT DOCUMENTS

| | | |
|---|---|---|
| JP | 2002-279817 | 9/2002 |
| JP | 2004-71167 | 3/2004 |
| JP | 2004-322858 | 11/2004 |

* cited by examiner

*Primary Examiner* — Hargobind S Sawhney
(74) *Attorney, Agent, or Firm* — McGinn IP Law Group, PLLC

(57) ABSTRACT

A surface emitting apparatus includes a light guide plate, a plurality of point light sources, a diffusing member, and a spacer member. The light guide plate has an end surface and a light emitting surface and is configured to allow light incident on the end surface to be emitted from the light emitting surface. The plurality of point light sources is provided to oppose the end surface of the light guide plate. The diffusing member is provided on a light emitting surface side of the light guide plate. The spacer member defines a space between the light emitting surface and the diffusing member such that a distance between the light emitting surface and the diffusing member is larger than a thickness of the light guide plate.

16 Claims, 6 Drawing Sheets

SURFACE LIGHT EMITTING APPARATUS

BACKGROUND OF THE INVENTION

1. Technical Field

The present invention relates to an improvement in a surface emitting apparatus.

2. Description of Related Art

JP-A-2004-71167, JP-A-2004-322858 and JP-A-2002-279817 describe examples of a surface emitting apparatus which introduces light of point light sources incident on an end surface (edge) of a light guide plate, and which emits planar light from a planar surface of the light guide plate.

FIG. 1A is a plan view of a surface emitting apparatus 100 as an example of a related art surface emitting apparatus, and FIG. 1B is a cross-sectional view taken along an X-X line indicated in FIG. 1A. As shown in FIG. 1A, the surface emitting apparatus 100 has a rectangular shape as an outer shape thereof in plan view, and includes a rectangular light emitting portion 500 formed on a planar surface thereof. As shown in FIG. 1B, the surface emitting apparatus 100 includes a light guide plate 300 and LED lamps 600 opposing an end surface of the light guide plate 300. Light emitted by the LED lamps 600 and incident on the light guide plate 300 is guided in the light guide plate 300, and then is emitted to an exterior via a diffusing sheet 510 stacked on the light guide plate 300. Accordingly, the light emitting portion 500 emits the planar light.

SUMMARY OF THE INVENTION

In the surface emitting apparatus 100 of the related art, on account of unevenness of an intensity distribution, the intensity unevenness that is called the "eyeball" occurs in an area of the light guide plate 300 in the vicinity of the LED lamps 600.

Since such intensity unevenness degrades the design property, the area of the light guide plate 300 in the vicinity of the LED lamps 600 is concealed from the appearance by a cover 400 so as to provide a distance L1' from the light incident surface of the light guide plate 300 to the edge of the light emitting portion 500. The distance L1' is generally called as an approach run distance. As a result, in a frame at a peripheral region of the light emitting portion 500, a length L2' of the frame on the side where the LED lamps 600 are provided becomes longer, and the frame on the side where the LED lamps 600 is elongated to yield an unattractive appearance. Increasing the number of light sources can reduce the intensity unevenness, but a production cost is increased, and it is disadvantageous from a viewpoint of heat radiation.

The present invention was made in view of the above circumstances, and an object thereof is to provide a surface emitting apparatus in which an occurrence of intensity unevenness can be prevented, in which the number of use of light sources is small, and which has a good appearance.

According to an aspect of the invention, there is provided a surface emitting apparatus, comprising: a light guide plate having an end surface and a light emitting surface and configured to allow light incident on the end surface to be emitted from the light emitting surface; a plurality of point light sources provided to oppose the end surface of the light guide plate; a diffusing member provided on a light emitting surface side of the light guide plate; and a spacer member that defines a space between the light emitting surface and the diffusing member such that a distance between the light emitting surface and the diffusing member is larger than a thickness of the light guide plate.

DETAILED DESCRIPTION OF THE EXEMPLARY EMBODIMENT

Figure 1A:
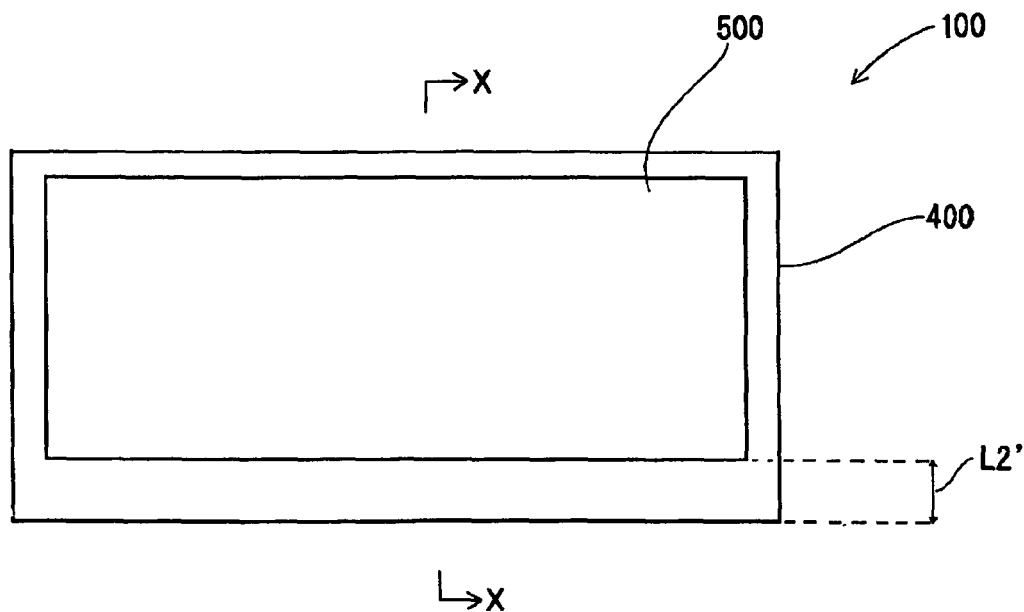
FIG. 1A is a plan view of a related-art surface emitting apparatus.

Elements of a surface emitting apparatus of an embodiment of the present invention will be explained in detail hereinafter.

A surface emitting apparatus of the embodiment includes a light guide plate having an end surface and a light emitting surface. The light guide plate is configured to allow light incident on the end surface to be emitted from the light emitting surface. The light guide plate is formed of light transmission material. The material of the light guide plate may be, for example, a transparent synthetic resin such as acrylic resin or polycarbonate resin, a transparent inorganic material such as glass, etc. The light guide plate has a substantially flat plate shape. Light sources are provided so as to oppose the end surface of the light guide plate, and the end surface serves as a light incident surface on which light from the light sources is incident. Here, the light sources may be opposed to plural end surfaces of the light guide plate, and the respective end surfaces may be employed as light incident surfaces.

A light diffusing/reflecting process is applied to a back surface (surface on the opposite side to the light emitting surface) of the light guide plate, and a light diffusing/reflecting area is formed thereon. As the light diffusing/reflecting process, various methods may be employed, for example, the formation of a light diffusing/reflecting pattern, the surface roughing process such as a graining process or a blasting process, the formation of a light diffusing/reflecting layer e.g., by the printing of a light diffusing/reflecting ink or the pasting of a light diffusing/reflecting tape, etc. The phrase "light diffusing/reflecting pattern" used in this specification means a set of light diffusing/reflecting shapes. As the light diffusing/reflecting shape, for example, a convex lens shape, a convex prism shape, and/or a diffusion dot shape may be employed.

The surface emitting apparatus of the embodiment includes a plurality of point light sources provided to oppose the end surface of the light guide plate. The type of point light sources is not limited, and for example, a self-luminous semiconductor light source such as the LED lamp or the organic electroluminescent (EL) lamp can be employed. Also, the type of LED lamp or the organic EL lamp is not particularly limited, and a bullet type, a surface mounted type, etc., can be employed. All of the plurality of point light sources may be the same type, or plural types of point light sources may be contained in the plurality of point light sources. The point light sources are arranged to oppose the end surface of the light guide plate. For example, the point light sources may be aligned linearly to have an array arrangement. It is preferable that the point light sources are arranged at equal intervals. This is because the intensity balance can be improved.

The surface emitting apparatus of the embodiment includes a diffusing member on the light emitting surface of the light guide plate.

The diffusing member may be made of a transparent or translucent resin (polyethylene resin, vinyl chloride resin, polyester resin, PET (polyethylene terephthalate) resin, PMMA (poly(methyl methacrylate)) resin, polycarbonate resin, etc) with unevenness regularly or at random on a surface, for example.

The diffusing member may be formed of a sheet (film) of the transparent or translucent resin, or may be integrally formed with a case storing the light guide plate by the transparent or translucent resin through the process of injection molding. A profile of the diffusing member can be set to have the shape substantially identical to the light emitting surface of the light guide plate, when viewed from the top, so as to cover an entire portion of the light emitting surface of the light guide plate.

A degree of a diffusing effect of the diffusing member can be represented by the haze value. The haze value of the diffusing member used in the surface emitting apparatus of the embodiment can be set to 50% to 99%, preferably 80% to 95%, and more preferably 90% to 95%, for example. This is because the surface light can be generated preferably. Here, the larger haze value yields a higher diffusivity and a lower transparency.

The surface emitting apparatus of the embodiment includes a spacer member that defines a space between the light emitting surface and the diffusing member such that a distance between the light emitting surface and the diffusing member is larger than a thickness of the light guide plate (e.g., a thickness of an end portion of the light guide plate 3 on a light incident surface 31 side). The space may be predetermined. The spacer member is not particularly limited in shape as long as the spacer member can define the space between the light emitting surface and the diffusing member. Also, the material is not particularly limited.

The space defined by the spacer member between the light emitting surface and the diffusing member is, e.g., 1 to 5 times, preferably 1 to 3 times, and more preferably 1 to 2 times of a thickness of the light guide plate (e.g., a thickness of an end portion of the light guide plate 3 on a light incident surface 31 side). For example, when the thickness of the light guide plate is about 3.0 to 4.0 mm, the space defined by the spacer member (i.e., distance between the light emitting surface and the diffusing member) is about 3.0 mm to about 20.0 mm, preferably about 3.0 mm to about 12.0 mm, and more preferably about 3.0 mm to about 8.0 mm.

According to this structure, since a mixture of the light emitted from the light emitting surface is promoted in the space, the periphery of the light emitting portion on the light source side is not excessively extended, and an appearance can be improved. Also, a thickness of the surface emitting apparatus is not excessively increased, and thus the surface emitting apparatus can be reduced in size.

According to the surface emitting apparatus of the embodiment, the light of the light sources incident on the light guide plate through the end surface of the light guide plate is guided in the light guide plate, and then emitted from the light emitting surface of the light guide plate. The light is incident on the diffusing member from the back surface of the diffusing member, and is diffused and emitted to the exterior. The spacer member is provided between the light emitting surface of the light guide plate and the diffusing member, and the distance between the light emitting surface and the diffusing member is set larger than the thickness of the light guide plate by the spacer member. Accordingly, the light emitted from the light emitting surface of the light guide plate is mixed until the light arrives at the back surface of the diffusing member. Then, the mixed light is further diffused by the diffusing member, and is emitted to the exterior. As a result, when observed from the outside, the occurrence of the intensity unevenness in the area in the vicinity of the light sources can be prevented. Therefore, there is no necessity to provide the cover, etc., in the area in the vicinity of the light sources, and the frame in the periphery region of the light emitting portion on the light source side is not excessively extended, and also the outward appearance can be improved. Since it is not needed to increase the number of use of the light sources, it is advantageous from a viewpoint of production cost, and also it is not disadvantageous from a viewpoint of heat radiation.

It is preferable that the spacer member is provided to define the space such that the intensity distribution appears uneven on the light emitting surface is uniformized on the outer surface of the diffusing member, and the light emitted from the light emitting surface is mixed in the space and then emitted to the exterior via the diffusing member. This is because the occurrence of the intensity unevenness generally called "eyeball" can be prevented satisfactorily.

The light guide plate may be spaced from the plurality of point light sources. According to this configuration, even when the light guide plate is expanded due to the heat generated by the point light sources, it is possible to prevent the light guide plate from contacting the point light sources.

If a gap is formed between the spacer member and an edge portion of the light emitting surface on an end surface side thereof, the diffusing member may be directly irradiated with light emitted from the point light sources and passing thorough the gap.

The light from the point light sources and directly applied to the diffusing member is occasionally divided into blue light and yellow light depending on the structure of the point light source. In this case, the blue light and the yellow light is mixed in the light emitted through the diffusing member to the outside of the surface emitting apparatus, which may cause the color unevenness and degrade the quality of light emission.

The longer the distance between the light guide plate and the point light sources or the longer the length of the spacer member, the more likely the light leaks from the gap.

Therefore, it is preferable that the spacer member is made of the light-shielding material and is provided as a wall contacting an edge portion of the light emitting surface on an end surface side, so as to block the light directly applied to the diffusing member from the point light sources. According to the configuration, it is possible to prevent the color unevenness caused by mixing the blue light and the yellow light into the light emitted to the outside through the diffusing member, and to avoid the deterioration of the quality of light emission. Also, the light emitting surface can be ensured widely and the surface emitting apparatus can be reduced in size.

The surface emitting apparatus of the embodiment may include a case storing the light guide plate, the case and the spacer member may be integrally formed, and the diffusing member may be fixed to the case.

That is, if both the case and the spacer member are made of the light-shielding material, the case and the spacer member may be integrally formed, and by fixing the diffusing member to the case, the number of parts can be reduced, which can reduce the cost.

EXAMPLE 1

Example 1 of the embodiment of the present invention will be explained in more detail hereunder.

Figure 2:
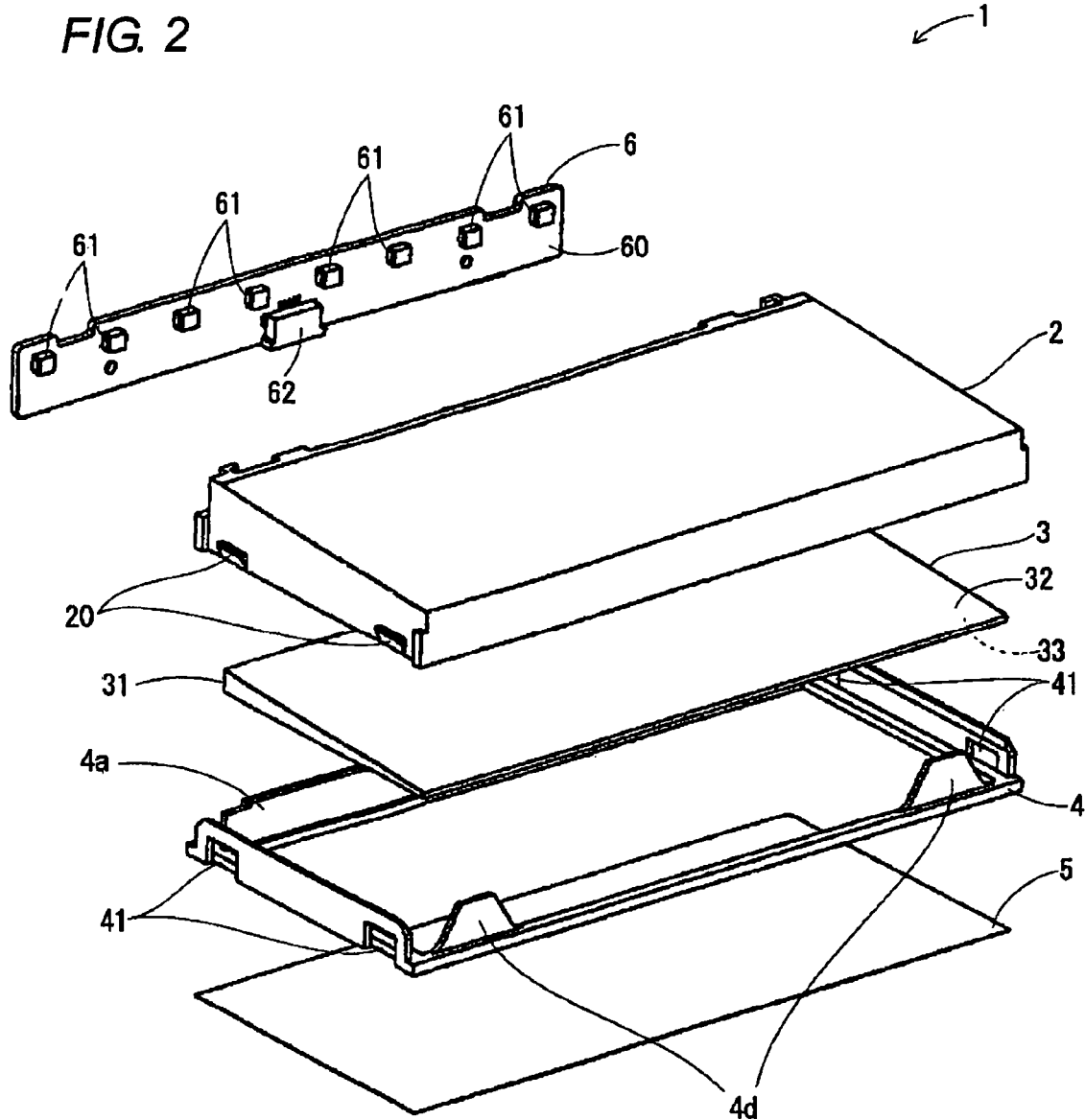
FIG. 2 is an exploded perspective view of a surface emitting apparatus according to an Example 1 of an embodiment of the present invention.

FIG. 2 is an exploded perspective view of a surface emitting apparatus 1 of the Example 1, which is viewed from the back surface side. The surface emitting apparatus 1 includes a case 2, a light guide plate 3, a cover 4, a diffusing sheet 5, and a light source assy 6. The case 2 has a rectangular shape having long sides and short sides in plan view, and hooks 20 are provided on wall surfaces extending along the short sides.

The case 2 stores the light guide plate 3. The cover is attached to an opening portion of the case 2. The diffusing sheet 5 is attached to the cover 4.

The material of the light guide plate 3 is an achromic and transparent PMMA (poly(methyl methacrylate)) resin. The light guide plate 3 has a substantial rectangular flat plate shape in plan view. In the light guide plate 3, length of a long side is about 120 mm, and a length of a short side is about 60 mm. An end surface extending along the long side opposes the light source assy 6, and serves as a light incident surface 31.

Microlens shapes are formed on a flat surface of the light guide plate 3 on the case 2 side, and serves as a reflecting surface 32. In the light guide plate 3, a flat surface located on the opposite side to the reflecting surface 32 constitutes a smooth surface, and serves as a light emitting surface 33 (FIG. 3). The light guide plate 3 has a tapered surface in cross section such that the reflecting surface 32 progressively comes closer to the light emitting surface 33 toward the end surface on the opposite side from the light incident surface 31.

The cover 4 is provided on the light emitting surface 33 side of the light guide plate 3. The cover 4 is a rectangular frame shape along the edge of the light emitting surface 33 in plan view. Engaging holes 41 that engage the respective hooks 20 of the case 2 are provided on wall surfaces of the cover 4 on short sides. A spacer portion 4a is provided in the cover 4 on the light incident surface 31 side of the light guide plate 3.

The light source assy 6 is provided on the light incident surface 31 side of the light guide plate 3. The light source assy 6 includes a substrate 60, LED lamps 61, and a connector 62.

The substrate 60 is a mounting substrate that is made, e.g., of aluminum. The substrate 60 has an elongated plate shape, and a length of the substrate 60 in a longitudinal direction thereof is substantially equal to the long side of the case 2. The substrate 60 includes a mounting surface, and circuits are formed on the mounting surface.

In the Example 1, the number of LED lamps 61 provided in the light source assy 6 is eight, and the LED lamps 61 are mounted on a mounting surface of the substrate 60. Eight LED lamps 61 are arranged linearly along the longitudinal direction of the substrate 60 so as to have equal intervals at a pitch of about 12 mm. The directional angle of the LED lamp 61 is about 70 degree. The LED lamp 61 may be, for example, a white LED lamp of the surface mounting type. The connector 62 is provided in a lower portion of a center portion of the substrate 60. Electric power provided from the outside is supplied to the LED lamps 61 via the connector 62.

The diffusing sheet 5 is provided on the cover 4 on the opposite side to the light guide plate 3. The material of the diffusing sheet 5 is an achromic and transparent poly(methyl methacrylate) (PMMA) resin. The shape of diffusing sheet 5 is the same as that of the cover 4 in plan view. The diffusing sheet 5 has a haze value of about 93%.

Figure 3A:
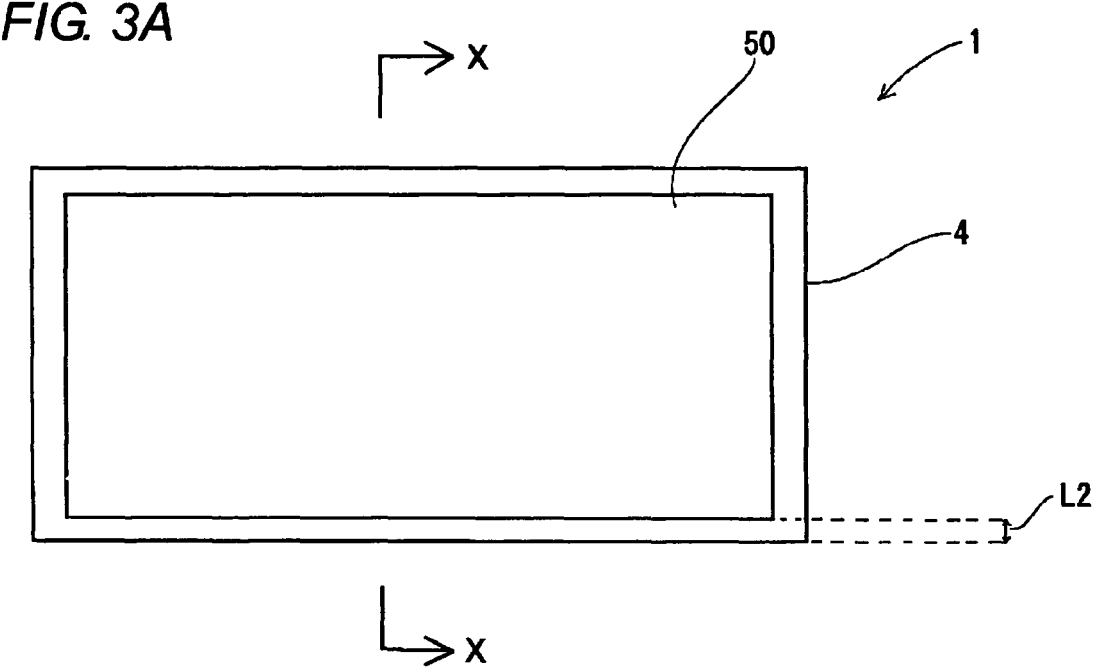
FIG. 3A is a plan view of the surface emitting apparatus of the Example 1.
Figure 3B:
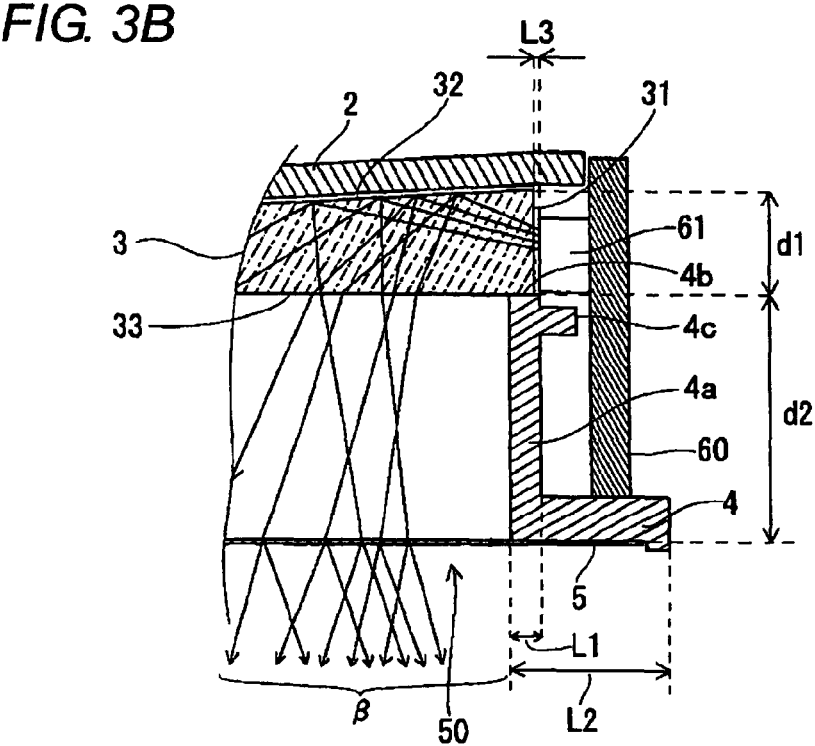
FIG. 3B is a cross-sectional view taken along an X-X line in FIG. 3A in the vicinity of an LED lamp.

FIG. 3A is a plan view of the surface emitting apparatus 1, and FIG. 3B is a cross-sectional view taken along an X-X line in FIG. 3A in the vicinity of the LED lamp 61.

As shown in FIG. 3A, an outer shape of the surface emitting apparatus 1 has a rectangular shape in plan view, and a long side of rectangular shape is about 120 mm and a short side thereof is about 60 mm. The surface emitting apparatus 1 includes a light emitting portion 50 provided on a flat surface portion thereof. The size of the light emitting portion 50 is smaller than that of the outer shape of the surface emitting apparatus 1, and the shape thereof is a rectangular shape having a long side of about 100 mm and a short side of about 50 mm.

As shown in FIG. 3B, the LED lamps 61 are provided to oppose the light incident surface 31 of the light guide plate 3. A thickness d1 of the end portion of the light guide plate 3 on the light incident surface 31 side is about 4.0 mm.

The light guide plate 3 and the LED lamp 61 are spaced each other by a distance L3.

The distance L3 is about 0.2 mm.

The spacer portion 4a of the cover 4 is made of a light-shielding material. The spacer portion 4a is provided as a wall so as to extend substantially perpendicular to the light emitting surface 33, such that a top end portion 4b of the spacer portion 4a is provided to contact the edge portion of the light emitting surface 33 on the light incident surface 31 side of the light guide plate 3. Accordingly, the spacer potion 4a can block the light which is directly applied to the diffusing sheet 5 from the LED lamp 61.

A thickness L1 of the spacer portion 4a is about 1.0 mm, and the spacer portion 4a overlaps with the edge portion of the light emitting surface 33 on the light incident surface 31 side by the length of the thickness L1. A length (height) d2 of the spacer portion 4a is about 7.6 mm, and the length d2 is about 1.9 times the thickness d1.

The cover 4 includes a strip-shaped projected portion 4c which projects toward the substrate 60 and which is provided in vicinity of the top end portion 4b of the spacer portion 4a. For example, the projected portion 4c extends along the top end portion 4b so as to protrude from the spacer portion toward an outer direction of the light emitting surface 33. In FIG. 3B, a width L2 (i.e., a distance from the edge of the surface emitting apparatus 1 to the light emitting portion 50) of the cover 4 is about 5.6 mm.

The cover 4 includes a second spacer portion 4d which is provided on the opposite side of the spacer portion 4a, so as to contact an edge portion of the light emitting surface 33 on a side opposite to the light incident surface 31. The second spacer portion 4d has a height which is substantially the same as the height d2 of the spacer portion 4a, so as to keep the light emitting surface 33 substantially in parallel with a surface of the diffusing sheet 5 opposing the light emitting surface 33. The second spacer portion 4d may be or may not be made of a light-shielding material. However, when the second spacer portion 4d is integrally formed with the cover 4 of the light-shielding material, the second spacer portion 4d is made of the light-shielding material.

Next, a light emission mode of the surface emitting apparatus 1 of the Example 1 will be described.

As shown in FIG. 3B, the light emitted from the LED lamps 61 is incident on the light guide plate 3 through the opposing light incident surface 31 of the light guide plate 3.

The light being incident on the light guide plate 3 is guided in the light guide plate 3. A part of the light reaches the reflecting surface 32 of the light guide plate 3, and then is diffused/reflected to the light emitting surface 33 side by the microlens shapes of the reflecting surface 32. The diffused/reflected light is emitted from the light guide plate 3 via the light emitting surface 33.

The emitted light travels through the space between the light emitting surface 33 and the back surface of the diffusing sheet 5, which is defined by the spacer portion 4a, and then arrives at the back surface of the diffusing sheet 5. The light arriving at the back surface of the diffusing sheet 5 is diffused by the diffusing sheet 5, and then is emitted from the surface of the diffusing sheet 5 to the exterior (see a plurality of arrows 13). Accordingly, the surface light is generated from the surface emitting apparatus 1.

In the surface emitting apparatus 1, the spacer portion 4a provides a space defining a distance between the light emitting surface 33 and the back surface of the diffusing sheet 5, which is about 1.9 times the thickness of the light guide plate 3.

Accordingly, as indicated by the arrows 13 shown in FIG. 3B, the light emitted from the light emitting surface 33 is mixed until the light arrives at the back surface of the diffusing sheet 5. Then, the mixed light is further diffused by the diffusing sheet 5, and then is emitted to the outside.

As a result, when observed from the outside, the occurrence of the intensity unevenness in the areas in the vicinity of the LED lamps 61 can be prevented.

Figure 1B:
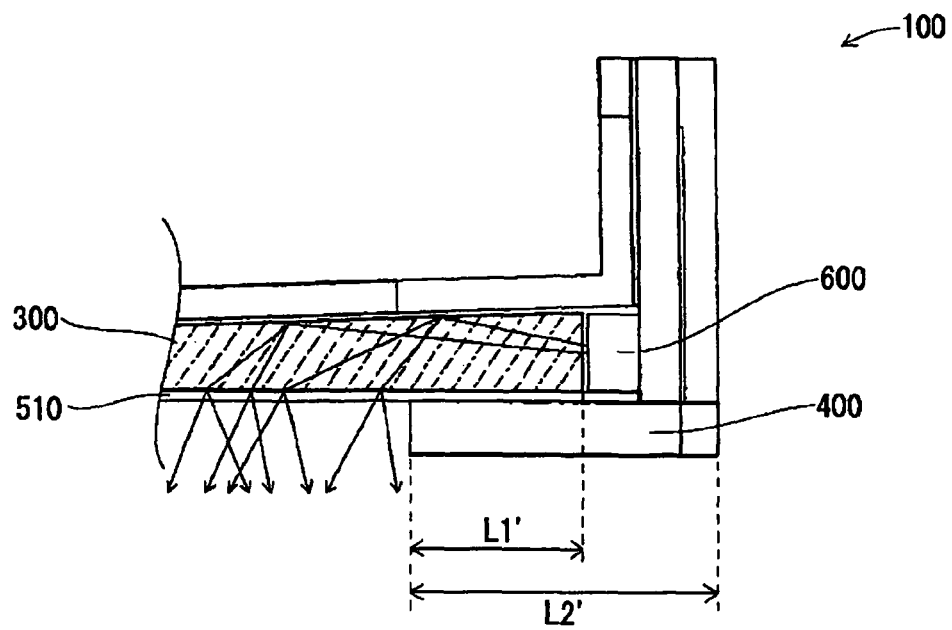
FIG. 1B is a cross-sectional view taken along an X-X line in FIG. 1A in the vicinity of an LED lamp.

In the related-art surface emitting apparatus 100 shown in FIG. 1B, the distance (approach run distance) L1' from the light incident surface of the light guide plate 300 to the edge of the light emitting portion 500 is about 6.5 mm, and the length L2' of the peripheral flame of the light emitting portion 500 on the side where the LED lamps 600 are provided is about 10.1 mm.

In contrast, as shown in FIGS. 2A and 2B, in the surface emitting apparatus 1 of the Example 1, the distance (approach run distance) L1 from the light incident surface 31 of the light guide plate 3 to the edge of the light emitting portion 50 is about 1.0 mm, and the width L2, i.e., the length of the periphery of the light emitting portion 50 on the side where the LED lamps 61 are provided, is about 5.6 mm.

In this manner, according to the surface emitting apparatus 1 of the Example 1, the occurrence of the intensity unevenness in the areas in the vicinity of the LED lamps 61 can be prevented, and thus the necessity of concealing the edge portion with the cover, or the like can be eliminated. Therefore, the distance L1 can be shortened, and also the width L2 of the light emitting portion 50 can be shortened.

As a result, the periphery of the light emitting portion 50 is not excessively extended, and an outward appearance can be improved. Also, according to the Example 1, it is not needed to increase the number of use of the LED lamps 61, and it is advantageous from a viewpoint of production cost. Also, since it is not necessary to increase the number of the LED lamps 61, it is not disadvantageous from a viewpoint of heat radiation.

In the surface emitting apparatus 1, the space having the distance that is about 1.9 times the thickness of the light guide plate 3 is provided between the light emitting surface 33 and the back surface of the diffusing sheet 5 by the spacer portion 4a.

Accordingly, the light emitted from the light emitting surface 33 is mixed adequately in the space to such an extent that the intensity unevenness is not caused when the light is emitted from the surface of the diffusing sheet 5. Also, because the space defined by the spacer portion 4a is about 1.9 times of the thickness of the light guide plate 3, the thickness of the surface emitting apparatus 1 is not excessively increased.

In the surface emitting apparatus 1 of the Example 1, the light guide plate 3 and the LED lamp 61 are spaced by the distance L3 (about 0.2 mm).

Providing the distance L3 can prevent the light guide plate 3 from contacting the LED lamp 61 even when the light guide plate 3 is expanded due to the heat generated by the LED lamp 61. When the light guide plate 3 contacts the LED lamp 61, undesirable creak or breakage of the light guide plate 3 or the LED lamp 61 may occur. However, the Example 1 providing the distance L3 can avoid such problem.

The specific value of the distance L3 may be set, for example, by determining an optimum value in accordance with the head expansion property of the light guide plate 3 by a test, etc.

Figure 4:
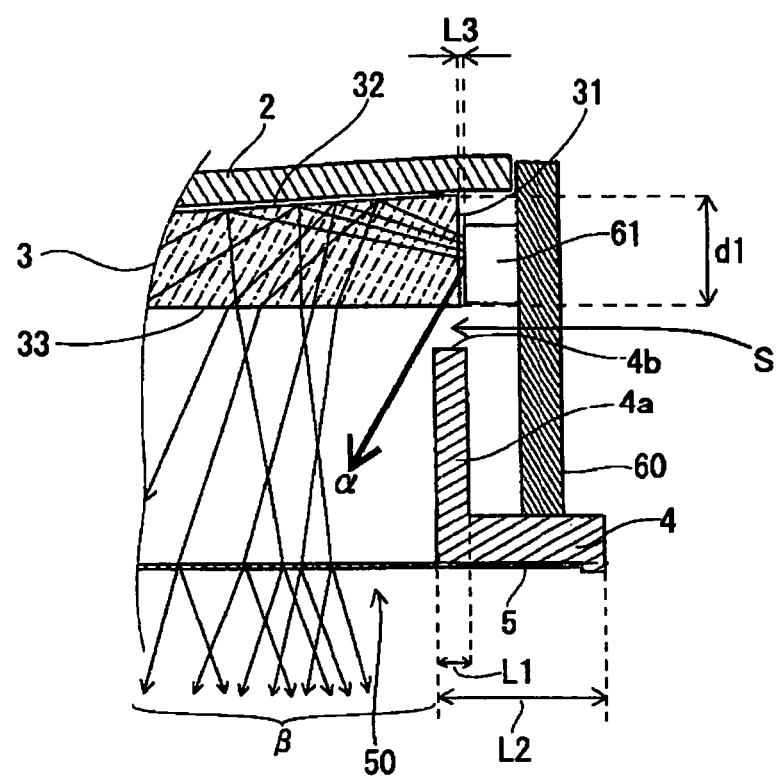
FIG. 4 is a cross-sectional view taken along the X-X line in FIG. 3A for explaining the effects and advantages of the example.

As shown in FIG. 4, if a gap S is formed between the top end portion 4b of the spacer portion 4a and an edge portion of the light emitting surface 33 on a light incident surface 31 side (on the end surface side) of the light guide plate 3, the diffusing sheet 5 may be directly irradiated with light emitted from the LED lamp 61 and passing thorough the gap S (see an arrow a).

The light from the LED lamp 61 and directly applied to the diffusing sheet 5 through the gap S is occasionally divided into blue light and yellow light depending on the structure of the LED lamp 61. In this case, the blue light and the yellow light is mixed in the light emitted through the diffusing sheet 5 to the outside of the surface emitting apparatus 1, which may cause the color unevenness and degrade the quality of light emission.

The longer the distance L3 or the longer the length d2 of the spacer portion 4a, the more likely the light leaks from the gap S.

In the surface emitting apparatus 1 of the Example 1, the spacer portion 4a of the cover 4 is made of the light-shielding material and is provided as a wall contacting the edge portion of the light emitting surface 33 of the light guide plate 3.

Accordingly, the surface emitting apparatus of the Example 1 does not have the gap S shown in FIG. 4. Consequently, the light from the LED lamp 61 and directly applied to the diffusing sheet 5 is blocked by the spacer portion 4a, which can prevent the color unevenness caused by mixing the blue light and the yellow light into the light emitted to the outside through the diffusing sheet 5, and also can avoid the deterioration of the quality of light emission.

In addition, in the surface emitting apparatus 1 of the Example 1, the top end portion 4b of the spacer portion 4a contacts the edge portion of the light emitting surface 33 of the light guide plate 3. Therefore, the light emitting surface 33 can be ensured as large area as possible, and the size of the apparatus can be reduced.

In the Example 1, the projected portion 4c is provided on the spacer 4a of the cover 4. Therefore, together with the structure in which the top end portion 4b of the spacer portion 4a contacts the edge portion of the light emitting surface 33 on the light incident surface 31 side, the light directly applied to the diffusing sheet 5 from the LED lamp 61 can surely be blocked by the spacer portion 4a.

Further, in the Example 1, since the projected portion 4c is provided on the cover 4, even when the substrate 60 is deflected, the substrate 60 contacts the projected portion 4c. Therefore, it is possible to prevent the excessive deflection of the substrate 60, and to retain the distance L3 between the light guide plate 3 and the LED lamp 61.

Further, the projected portion 4c can prevent the leakage of the light emitted from the LED lamp 61 into the space defined between the spacer portion 4a and the substrate 60, which can prevent the decrease of the light amount incident on the light guide plate 3.

EXAMPLE 2

The Example 2 of the embodiment will be described below.

In the Example 2, members and elements common to the Example 1 shown in FIG. 2 and FIGS. 3A and 3B are cited by use of the same reference symbols or designations, thereby omitting their overlapping explanations.

Figure 5:
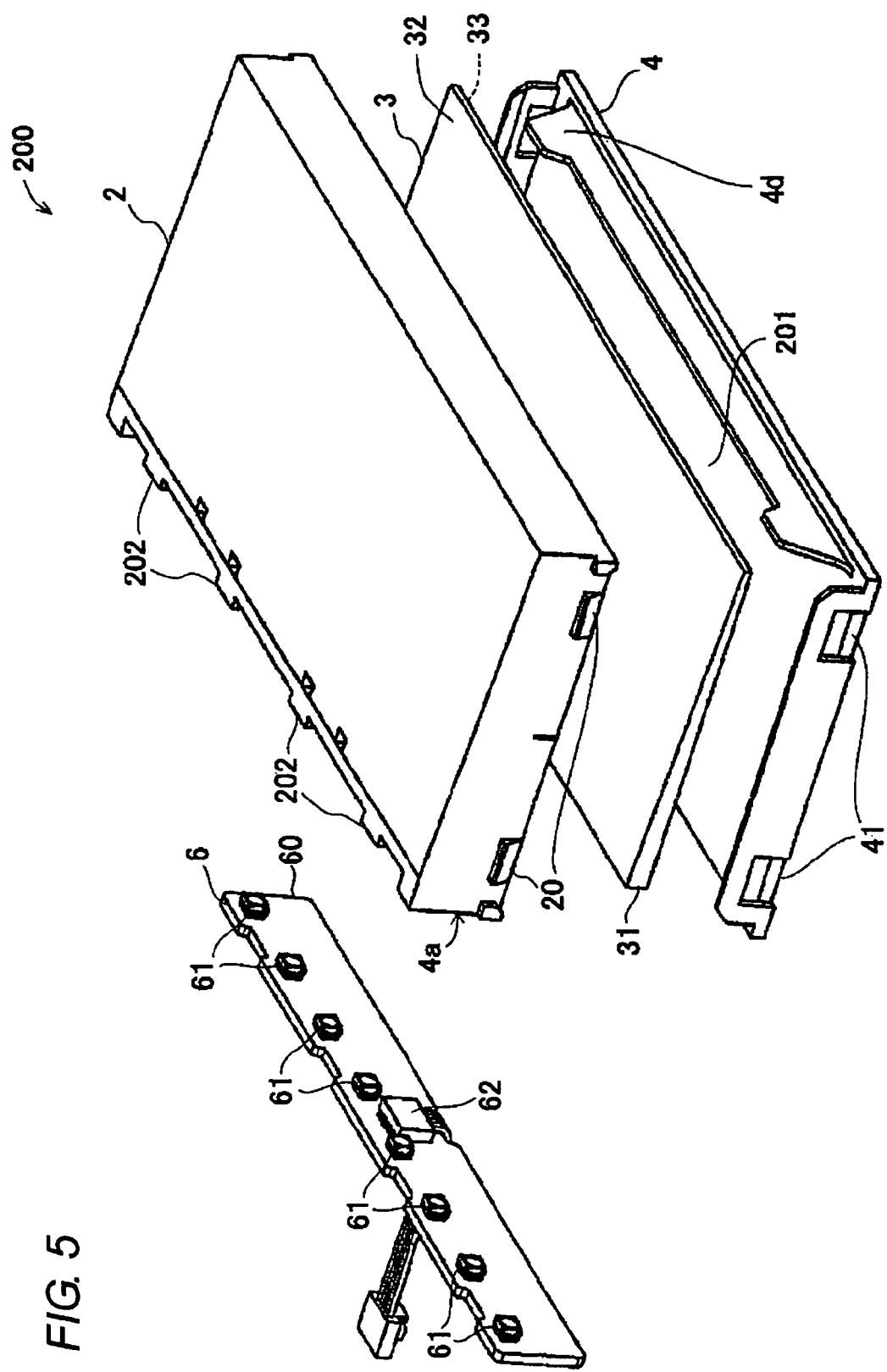
FIG. 5 is an exploded perspective view of a surface emitting apparatus of an Example 2 of the embodiment, which is viewed from the back surface side thereof.

FIG. 5 is an exploded perspective view of a surface emitting apparatus 200 of the Example 2, which is viewed from the back surface side thereof.

Figure 6A:
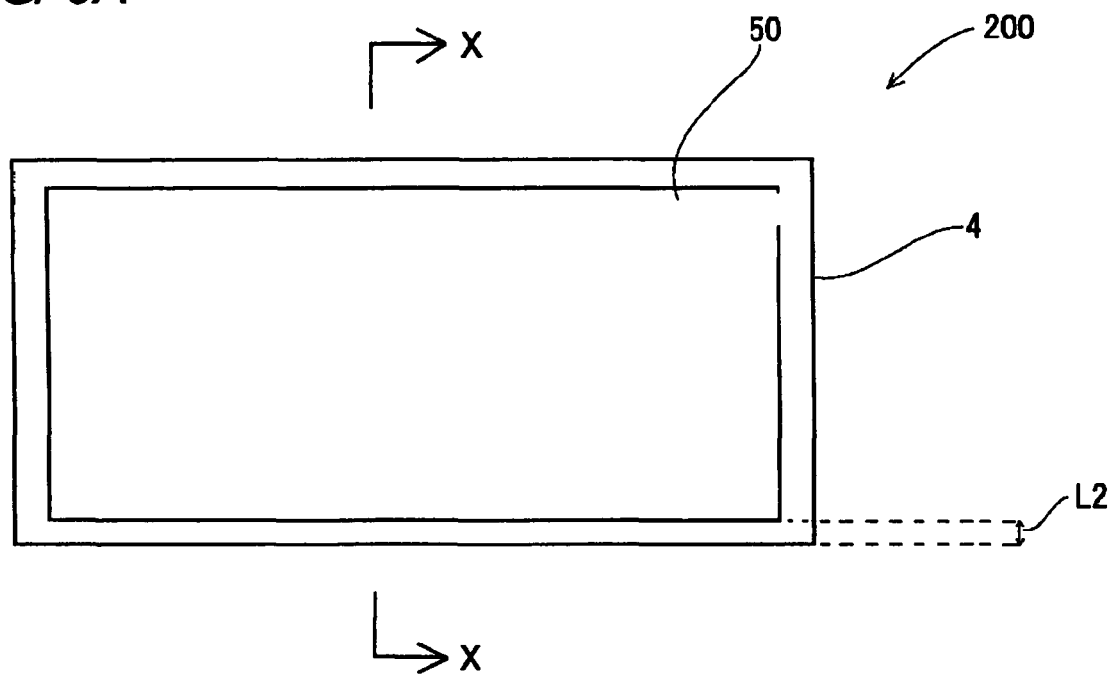
FIG. 6A is a plan view of the surface emitting apparatus of the Example 2.

FIG. 6A is a plan view of the surface emitting apparatus 200.

Figure 6B:
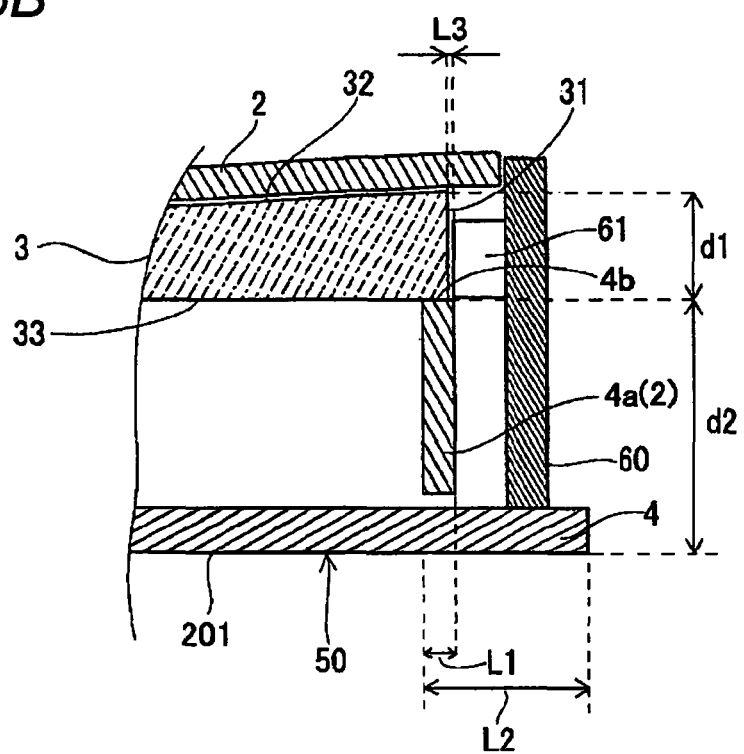
FIG. 6B is a cross-sectional view taken along an X-X line in FIG. 6A in the vicinity of an LED lamp.

FIG. 6B is a cross-sectional view taken along a line X-X in FIG. 6A in the vicinity of an LED lamp 61.

The surface emitting apparatus 200 includes a case 2, a light guide plate 3, a cover 4, and a light source assy 6.

In the surface emitting apparatus 200, the different portions from the surface emitting apparatus 1 of the Example 1 are described below.

(1) The cover 4 does not provided with the spacer portion 4a. Instead, the spacer portion 4a is provided at the case 2 on the side closer to the light incident surface 31 of the light guide plate 3.

The spacer portion 4a and the case 2 are integrally formed by light-shielding synthetic resin material through the process of injection molding.

On the other hand, the second spacer portion 4d is integrally formed with the cover 4, similar to the Example 1.

(2) In the cover 4, a planer diffusing member (a diffusing plate) 201 is provided on a side opposite to the light guide plate 3 corresponding to the opening portion of the case 2.

The function of the diffusing member 201 is the same as that of the diffusing sheet 5 of the Example 1.

The diffusing member 201 and the cover 4 are integrally formed by transparent or translucent synthetic resin material (for example, polycarbonate resin) through the process of injection molding.

When the second spacer portion 4d is integrally formed with the cover 4 (diffusing member 201), the second spacer portion 4d is also made of the transparent or translucent synthetic resin material.

Side walls of the cover 4 provided with the diffusing member 201 is fitted and fixed to the case 2.

(3) The spacer portion 4a of the case 2 includes four ribs 202 which are provided on a top end side of the spacer portion 4a so as to oppose the substrate 60. The ribs 202 have a substantially rectangular parallelepiped shape, and are arranged at positions corresponding to intervals between adjacent LED lamps 61 mounted on the substrate 60.

Accordingly, the Example 2 can also provide the effects and advantages similar to those of the Example 1.

Further, in the Example 2, the spacer portion 4a and the case 2 are integrally formed, and the diffusing member 201 and the cover 4 are also integrally formed. As compared with the Example 1 which includes the diffusing sheet 5, the number of parts can be reduced, and the cost can also be reduced.

In the Example 2, since the case 2 includes the ribs 202, even when the substrate 60 is deflected, the substrate 60 contacts the ribs 202. Therefore, it is possible to prevent the excessive deflection of the substrate 60, and to retain the distance L3 between the light guide plate 3 and the LED lamp 61.

The present invention is not limited to the embodiment and the examples of the above, and various changes or modifications may be made without departing from the scope of the claims appended hereto. The contents of patent publication indicated in the specification are incorporated herein by reference.

The surface emitting apparatus of the embodiment can be used as the light source of various apparatuses. For example, the surface emitting apparatus of the embodiment can be used as the vehicle room lamp.

What is claimed is:

1. A vehicle room lamp including a surface emitting apparatus, said vehicle room lamp comprising:
    a light guide plate having an end surface and a light emitting surface and configured to allow light incident on the end surface to be emitted from the light emitting surface;
    a plurality of point light sources provided to oppose the end surface of the light guide plate;
    a diffusing member provided on a light emitting surface side of the light guide plate;
    a spacer member that defines a space between the light emitting surface and the diffusing member such that a distance between the light emitting surface and the diffusing member is larger than a thickness of the light guide plate;
    a substrate that, with respect to a direction perpendicular to a direction of an extension of the space between the light emitting surface and the diffusing member, extends below the space, the substrate comprising:
        a side surface that abuts the spacer member; and
        an upper surface on which the plurality of point light sources is disposed;
    a case which stores the light guide plate;
    a cover attached to an opening portion of the case,
        wherein the light guide plate is spaced from the plurality of point light sources,
        wherein the spacer member defines the space such that an intensity distribution that appears uneven on the light emitting surface is uniform on an outer surface of the diffusing member, whereby the light emitted from the light emitting surface is mixed in the space and is emitted to an exterior via the diffusing member,
        wherein the spacer member comprises a light-shielding material and is provided as a wall contacting an edge portion of the light emitting surface on an end surface side thereof, thereby blocking light directly applied to the diffusing member from the point light sources,
        wherein the spacer member overlaps with the edge portion of the light emitting surface on a light incident surface side by a length of a thickness of the spacer member,
        wherein the spacer member and the case are integrally formed by a light-shielding synthetic resin material,
        wherein the diffusing member and the cover are integrally formed by a transparent or a translucent synthetic resin material, and
        wherein a haze value of the diffusing member is set in a range from 90% to 95%; and
    a plurality of ribs which are provided on a top end side of the spacer member so as to oppose the substrate and which are arranged at positions corresponding to intervals between adjacent point light sources.

2. The vehicle room lamp according to claim 1, wherein the space between the light emitting surface and the diffusing member, which is defined by the spacer member, is 1 to 2 times of the thickness of the light guide plate.

3. The vehicle room lamp according to claim 2, wherein the space defined by the spacer member is about 3.0 mm to about 8.0 mm.

4. The vehicle room lamp according to claim 1, wherein the light guide plate further comprises:
another end surface opposed to the end surface; and
a reflecting surface opposed to the light emitting surface, and
wherein the reflecting surface approaches the light emitting surface as the light guide plate extends toward the another end surface.

5. The vehicle room lamp according to claim 4, wherein the light guide plate has a tapered surface in a cross section such that the reflecting surface progressively approaches the light emitting surface as the light guide plate extends from the end surface toward the another end surface.

6. The vehicle room lamp according to claim 1, wherein the thickness of the light guide plate decreases as the light guide plate extends away from the end surface.

7. The vehicle room lamp according to claim 1, wherein a thickness of the light guide plate continuously decreases as the light guide plate extends away from the end surface.

8. The vehicle room lamp according to claim 1, wherein, in a cross view, in the direction perpendicular to the direction of the extension of the space between the light emitting surface and the diffusing member, with respect to the upper surface of the substrate, a bottom surface of the spacer member is located higher than an upper surface of the light sources.

9. The vehicle room lamp according to claim 1, wherein the space between the light emitting surface and the diffusing member which is defined by the spacer member is 1 to 5 times of the thickness of the light guide plate.

10. A vehicle room lamp including a surface emitting apparatus, said vehicle room lamp comprising:
a light guide plate comprising an end surface and a light emitting surface to emit light incident on the end surface from the light emitting surface;
a plurality of light sources that oppose the end surface of the light guide plate;
a diffusing member provided on a light emitting surface side of the light guide plate;
a spacer member that defines a space between the light emitting surface and the diffusing member such that a distance between the light emitting surface and the diffusing member is larger than a thickness of the light guide plate;
a substrate that, with respect to a direction perpendicular to a direction of an extension of the space between the light emitting surface and the diffusing member, extends below the space, the substrate comprising:
a side surface that abuts the spacer member; and
an upper surface on which the plurality of point light sources is disposed;
a case which stores the light guide plate;
a cover attached to an opening portion of the case,
wherein the light guide plate is spaced from the plurality of light sources,
wherein the spacer member defines the space such that an intensity distribution that appears uneven on the light emitting surface is uniform on an outer surface of the diffusing member, whereby the light emitted from the light emitting surface is mixed in the space and is emitted to an exterior via the diffusing member,
wherein the spacer member comprises a light-shielding material and is provided as a wall contacting an edge portion of the light emitting surface on an end surface side thereof, thereby blocking light directly applied to the diffusing member from the light sources,
wherein the spacer member and the case are integrally formed by a light-shielding synthetic resin material,
wherein the diffusing member and the cover are integrally formed by a transparent or a translucent synthetic resin material,
wherein the spacer member overlaps with the edge portion of the light emitting surface on a light incident surface side by a length of a thickness of the spacer member, and
wherein a haze value of the diffusing member is set in a range from 90% to 95%; and
a plurality of ribs which are provided on a top end side of the spacer member so as to oppose the substrate and which are arranged at positions corresponding to intervals between adjacent light sources.

11. The vehicle room lamp according to claim 10, wherein the light guide plate further comprises:
another surface opposed to the end surface; and
a reflecting surface opposed to the light emitting surface,
wherein the light guide plate has a tapered surface in a cross section such that the reflecting surface approaches the light emitting surface as the light guide plate extends from the end surface toward the another surface.

12. The vehicle room lamp according to claim 10, wherein the thickness of the light guide plate continuously decreases as the light guide plate extends away from the end surface.

13. The vehicle room lamp according to claim 10, wherein the space between the light emitting surface and the diffusing member which is defined by the spacer member is 1 to 5 times of the thickness of the light guide plate.

14. A vehicle room lamp including a surface emitting apparatus, said vehicle room lamp comprising:
a light guide plate comprising an end surface and a light emitting surface to emit light incident on the end surface from the light emitting surface;
a plurality of light sources that oppose the end surface of the light guide plate;
a diffusing member provided on a light emitting surface side of the light guide plate;
a spacer member that defines a space between the light emitting surface and the diffusing member such that a distance between the light emitting surface and the diffusing member is larger than a thickness of the light guide plate;
a case which stores the light guide plate;
a cover attached to an opening portion of the case,
wherein the light guide plate is spaced from the plurality of light sources,
wherein the spacer member defines the space such that an intensity distribution that appears uneven on the light emitting surface is uniform on an outer surface of the diffusing member, whereby the light emitted from the light emitting surface is mixed in the space and is emitted to an exterior via the diffusing member,
wherein the spacer member comprises a light-shielding material and is provided as a wall contacting an edge portion of the light emitting surface on an end surface side thereof, thereby blocking the light directly applied to the diffusing member from the light sources,
wherein the spacer member and the case are integrally formed by a light-shielding synthetic resin material, wherein the diffusing member and the cover are integrally formed by a transparent or a translucent synthetic resin material,
wherein the spacer member overlaps with the edge portion of the light emitting surface on a light incident surface side by a length of a thickness of the spacer member, and
wherein a haze value of the diffusing member is set in a range from 90% to 95%;
a substrate on which the plurality of light source is mounted; and
a plurality of ribs which are provided on a top end side of the spacer member so as to oppose the substrate and which are arranged at positions corresponding to intervals between adjacent light sources.

15. The vehicle room lamp according to claim 14, wherein the space between the light emitting surface and the diffusing member which is defined by the spacer member is 1 to 5 times of the thickness of the light guide plate.

16. The vehicle room lamp according to claim 14, wherein side walls of the cover provided with the diffusing member are fitted and fixed to the case.

\* \* \* \* \*